United States Patent [19]

Summers et al.

[11] 4,103,052

[45] Jul. 25, 1978

[54] TWO-WAY WINDOW GRID

[75] Inventors: John J. Summers; Larry G. Willis, both of Vincennes, Ind.

[73] Assignee: National Gypsum Company, Dallas, Tex.

[21] Appl. No.: 777,742

[22] Filed: Mar. 14, 1977

Related U.S. Application Data

[63] Continuation of Ser. No. 672,149, Mar. 31, 1976, abandoned.

[51] Int. Cl.[2] .......................... B32B 3/00; B32B 17/06

[52] U.S. Cl. ...................................... 428/38; 101/114; 101/129; 427/376 R; 428/210; 428/432

[58] Field of Search ............... 427/148, 372, 146, 376, 427/428; 101/29, 114, 129; 428/210, 428, 432, 14, 15, 38, 207

[56] References Cited

U.S. PATENT DOCUMENTS

| | | | |
|---|---|---|---|
| 2,716,300 | 8/1955 | Bopp | 428/210 X |
| 3,816,161 | 6/1974 | Buckley | 428/210 X |
| 3,874,977 | 4/1975 | Pyles | 428/210 X |
| 3,922,458 | 11/1975 | Lynch | 428/210 X |

*Primary Examiner*—Marion E. McCamish
*Assistant Examiner*—R. Eugene Varndell, Jr.
*Attorney, Agent, or Firm*—Robert F. Hause

[57] ABSTRACT

A window having the highly desirable appearance of being a plurality of panes each adjoined to adjacent panes by cross-bars having the triangular cross-section, on each face of the window, which is typical of the cross-bars of wooden divided sash, which appearance is created by the printing of a single design on only one side of the window with only one color, and incorporating unpainted areas to produce the illusion of three-dimensional depth of a triangular cross-section.

7 Claims, 4 Drawing Figures

TWO-WAY WINDOW GRID

This is a continuation of application Ser. No. 672,149, filed Mar. 31, 1976 abandoned.

This invention relates to a simulated multi-pane window having unusual reality with complete simplicity of manufacture, and particularly to a window having a plurality of triangular appearing cross-bars painted thereon by a single silk screen process.

A highly desirable form of window, with certain architectural environments, is one having a plurality of small panes which make up the total window, with the panes normally of a rectangular or diamond configuration. Such windows can be made by fabricating actual frames or cross-bars within the area of the window and small glass panes mounted within each little section formed by such cross-bars. A common method of simulating such windows is by forming a grid of cross-bars which are then placed against one face of a single large sheet of glass, forming the window.

It is an object of the present invention to provide a simulated multi-pane window at even less cost and complication than the face grid which is placed against one face of a window glass.

It is a further object to provide a simulated multi-pane window with novel cross-bars painted onto one face of the window glass.

It is a still further object of the invention to provide a novel window having the appearance of three-dimensional cross-bars by the use of a one-color design printed on only one face of the window glass.

These and other objects and advantages of the invention will be more readily apparent when considered in relation to the preferred embodiments as set forth in the specification and shown in the drawings in which.

Figure 1:
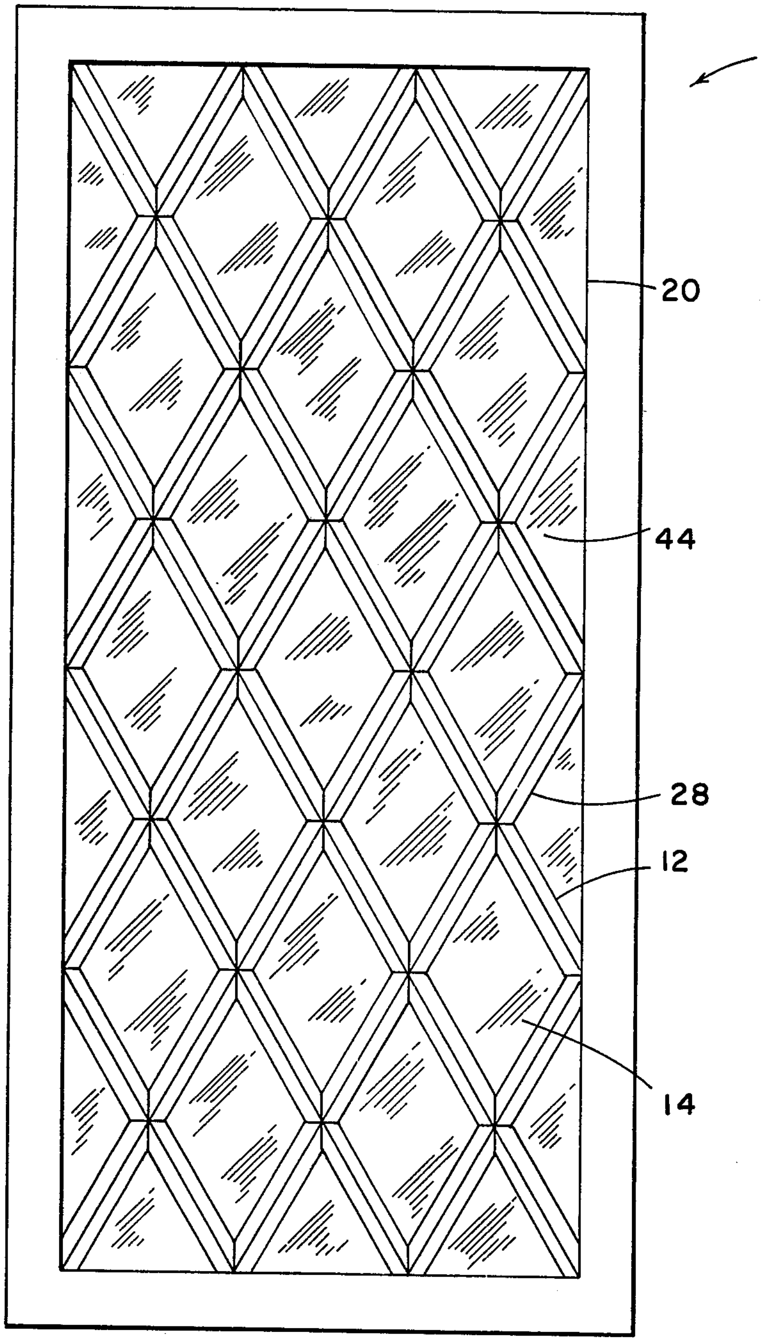
FIG. 1 is a front view of a multi-pane window, showing the appearance of a window embodying the present invention.

Referring to FIG. 1 there is shown a window 10 having the appearance of a window having cross-bars 12 extending diagonally across the window forming what appears to be individual panes 14 of glass. Thus the window 10 of FIG. 1 could be either a three multi-pane window or it could be a window containing a single flat sheet of glass 20, as shown in FIG. 2.

Figure 3:
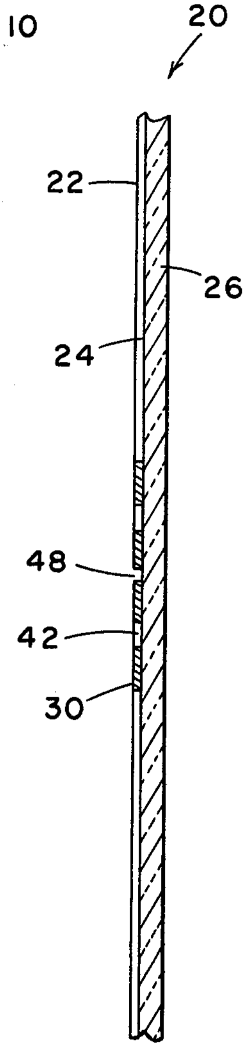
FIG. 3 is a cross-section of the window glass of FIG. 2 taken on line 3—3.
Figure 2:
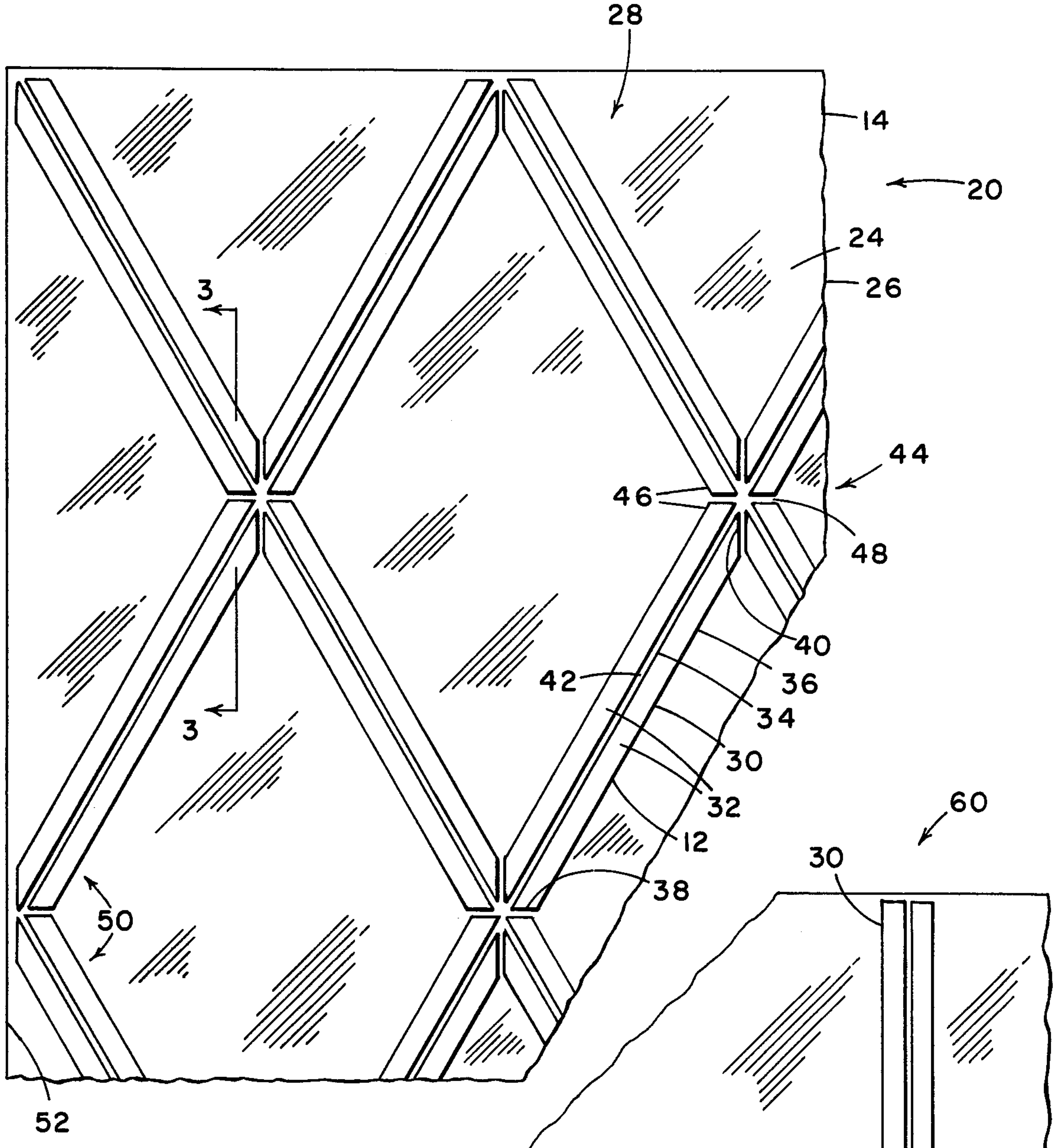
FIG. 2 is a front view of a portion of a window glass embodying the present invention.

The simulated multi-pane glass sheet 20 of FIGS. 2 and 3 has a single opaque coating of white ceramic paint 22 on preselected portions of one face 24 of a clear glass backing 26. The preselected portions with paint 22 are such that the paint 22 depicts a grid 28 of cross-bars 30 having a three-dimensional appearance.

The cross-bars 30 of the novel window design are each formed of a pair of closely spaced truncated triangles 32. The truncated triangles each have a pair of parallel long sides 34, 36, of which side 34 is longer than side 36, and a pair of short sides 38, 40. Sides 38 and 40 are at directions perpendicular one to the other. The triangles 32 of a cross-bar are arranged with their respective longer long sides 34 parallel and with a narrow space 42 therebetween.

The cross-bars 30 are arranged to form junctions 44, whereat four cross-bars 30 join to form a cross which consists of the four cross-bars. The ends 46 of all the cross-bars 30 are spaced at short distance from the ends 46 of adjacent cross-bars 30 forming a space 48 therebetween.

The space 42 between the truncated triangles of each cross-bar and the space 48 between the ends of adjacent cross-bars 30 are elongate narrow spaces exposing the clear glass of glass backing 26, and are preferably of a width substantially less than the width of a truncated triangle 32.

In a preferred form of the invention, the individual panes 14 of a window in accordance with the invention have edge dimensions of about one foot (0.3 meter). The cross-bars 30 have a width of about $\frac{5}{8}$ inch ($1\frac{1}{2}$ cm) consisting of two truncated triangles 32 of widths of about 5/16 inch ($\frac{3}{4}$ cm) and a space 42 therebetween about 1/32 inch (1/16 cm). The space 48 is also about 1/32 inch (1/16 cm) in width.

The very narrow space 42 along the middle of each cross-bar 30 creates the illusion of the cross-bar having a triangular cross-section with the center being thicker than the edges. The narrow spaces 48 at the junctions 44 create the illusion of tightly abutted mitered ends of non-uniform cross-section cross-bars, such as triangular cross-section cross-bars.

The edge portion of glass 20 has pairs 50 of cross-bars 30 meeting about $\frac{1}{2}$ inch (1 cm) from the edge 52 of the glass backing 26 forming essentially one half of a junction such as the junction 44, with a space 48 between cross-bars 30.

Figure 4:
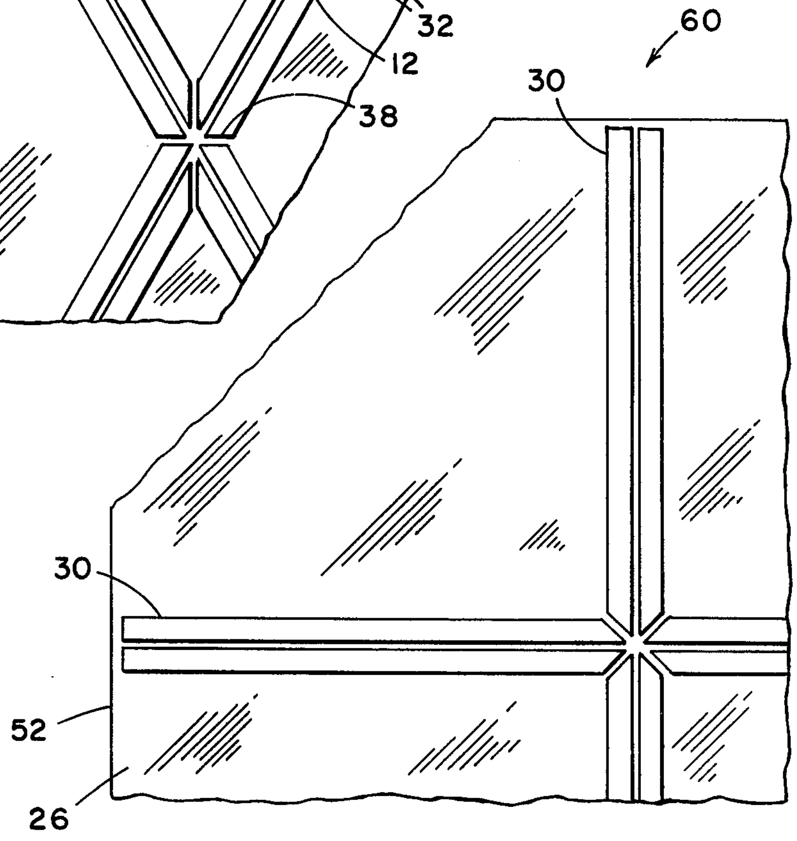
FIG. 4 is a front view of a portion of a modified form of a window glass, embodying the present invention.

FIG. 4 is a view similar to FIG. 2, of a modified form of glass 60, wherein the cross-bars 30 are arranged parallel to the edges 52 of the glass backing 26, rather than forming diamond shaped panes as in FIG. 2.

The paint 22 is preferably a baked-on-white ceramic paint. The paint can be applied by available and known silk screen processes, and subsequently heat cured by known techniques. The paint could alternatively be of other compositions, such as a soft enamel coating. A double pane insulated window with the soft enamel coating on an internal surface of one pane is an example of a window in which the coating could be completely protected and satisfactory, in accordance with the invention.

The glass 20 is suitable for use as a window or a glass door. Of particular significance is the fact that the cross-bars are visible from both sides of the glass with substantially equal clarity and with a similar illusion of three dimensions to the cross-bars, resulting from a single silk screening operation, whereas if illusion lines created by the spaces 42, 48 had instead been painted onto a previously painted cross-bar, it would have had to be done on both faces of the glass, requiring four operations.

Having completed a detailed disclosure of the preferred embodiments of our invention, so that those skilled in the art may practice the same, I contemplate that variations may be made without departing from the essence of the invention or the scope of the appended claims.

We claim:

1. A single sheet of glass having the appearance of a plurality of parallelogram panes of clear glass with real cross-bars therebetween, said sheet of glass consisting essentially of a flat backing sheet of clear glass and a pigmenting opaque coating on portions of only one face of said backing sheet, said coating being disposed in a pattern consisting of cross-bar designs defining the edges of said parallelogram panes, each said cross-bar design consisting of a pair of spaced, parallel truncated triangles, each said truncated triangle having two parallel long sides of uneven length and two short sides each forming an acute angle with the longer of the two long sides, said two short sides having respective directions of 90° relative to the opposite short side, said cross-bars having junctions whereat four cross-bars substantially meet, said cross-bars having short sides of said truncated triangles spaced from short sides of truncated triangles of adjacent cross-bars, said spacing between cross-bars being substantially equal to the spacing between the truncated triangles of each said cross-bar, and said spacings all being free of any coating and each being substantially less than the width of said truncated triangles.

2. A sheet of glass as defined in claim 1 wherein said coating is a white paint.

3. A sheet of glass as defined in claim 1 wherein said parallelogram panes are diamond shaped.

4. A sheet of glass as defined in claim 1 wherein said parallelogram panes are rectangular.

5. A sheet of glass as defined in claim 4 wherein said sheet of glass is rectangular and said cross-bar designs are parallel to the edges of said sheet of glass.

6. A single sheet of glass having the appearance of a plurality of parallelogram panes of clear glass with real cross-bars therebetween, said sheet of glass consisting essentially of a backing sheet of clear glass and a pigmented opaque coating on portions of only one face of said backing sheet, said coating being disposed in a pattern consisting of cross-bar designs defining the edges of said parallelogram panes, each said cross-bar design consisting of a pair of parallel truncated triangles, each said truncated triangle having two parallel long sides, one side being longer than the other and two short sides each forming an acute angle with the longer of the two long sides, said longer sides being disposed toward each other and spaced apart to define a first gap, said first gap forming a highlight line to create an illusion of said cross-bar having a triangular cross-section with the center thicker than the edges thereof, said two short sides having respective directions of 90° relative to the opposite short side, said cross-bars having junctions whereat four cross-bars substantially meet, said cross-bars having short sides of said truncated triangles spaced from short sides of truncated triangles of adjacent cross-bars to define a second gap, said second gap forming another highlight to create an illusion of tightly abutted mitered ends of non-uniform cross-section cross-bars, said second gaps being substantially equal to the spacing between the truncated triangles of each said cross-bar, and said gaps each being substantially less than the width of said truncated triangles.

7. The method of making a glass sheet having the appearance of a plurality of panes of clear glass with real cross-bars therebetween, comprising the steps of applying an opaque coating to preselected areas of an otherwise clear glass backing, applying said coating on only one face of said glass backing, using only one coating composition for said application of said coating, forming said preselected areas for coating to represent a three-dimensional element of non-uniform height from the plane of the said one face, providing said three-dimensional appearance by forming the appearance of a highlight line, forming said highlight line appearance by omitting coating along a narrow line with coating disposed on the two sides of said narrow uncoated line wherein said three dimensional element is a grid of cross-bars and wherein a highlight line as defined therein is formed along the center of said cross-bars and at the ends of said cross-bars where said cross-bars abut the ends of adjacent cross-bars.

* * * * *